Patented Aug. 9, 1938

2,126,677

UNITED STATES PATENT OFFICE 2,126,677

UREA RESIN TYPE MOLDING COMPOSITION AND PROCESS OF MAKING SAME

Carleton Ellis, Montclair, N. J., assignor to Ellis-Foster Company, a corporation of New Jersey No Drawing. Application June 15, 1935, Serial No. 26,826

2 Claims. (Cl. 106—22)

The present application is a continuation-in-part of application Ser. No. 1,698 filed January 14, 1935, in continuing the subject matter thereof which relates to the subjection of urea-formaldehyde resins to the action of pressure prior to shaping before molding, and of application Ser. No. 426,192 filed February 5, 1930 insofar as it continues the subject matter relating to the impregnation of cellulose with urea resins under pressure prior to molding. The invention claimed in application 426,192 is directed primarily to the use of urea-formaldehyde resins in the manufacture of veneers. Application 1,698 continues from application 689,165 the idea of subjecting urea-formaldehyde resins to the action of differential rolls prior to molding. The present case, therefore, continues this subject matter from application 689,165 and to this extent is a continuation-in-part of that application as well as of U. S. Patent 1,536,881 which was co-pending with application 689,165. The invention claimed in application 689,165 is directed primarily to acid resinified urea-formaldehyde resins.

The object of the present invention is to subject urea-formaldehyde resins prior to molding to the action of pressure in order to make said resins more amenable to molding under pressure.

As most molding compositions of the urea resin type include additions of cellulose as a filler which, by the way, as I have noted in previous applications probably involves a reaction in the nature of formation of a chemical compound designated urea resin cellulosate, conditions of hydration arise which are quite different from those obtaining in the preparation of molding compositions from the customary anhydrous phenol-formaldehyde resins. In the latter case the reaction in making the resin is ordinarily carried to the point where a separation of crude resin from the aqueous portion of any formalin used results, permitting the production of a substantially anhydrous resin stock which may then be incorporated with cellulose fiber. On the other hand, the pronounced hydrophilic properties of urea resin in those stages of preparation which permit the introduction of cellulose as a filler necessitate the presence of considerable water arising from formalin and a resultant swelling of the cellulose fibers comes about. This tends to produce a dried composition of a very voluminous character. For example, when ground in a ball mill such a powder may have a specific volume of 250 to 275 cc., that is, 100 grams of the composition will evidence this bulk as contrasted with a corresponding weight of water. Conditions, therefore, obtain in the production of urea resin molding compositions which do not appear when phenol-formaldehyde molding compositions are prepared.

The present invention seeks in part to embrace methods which will approximately offset the swelling and voluminizing effect of water on cellulose and which will provide a densified and compact material of such density that the cavities of molds used in the operation of making molded articles do not have to be made unduly large. The present process enables molds which are now used for phenol-formaldehyde compositions to be readily and usefully employed for molding urea resin products.

Since one particular virtue of urea resin molding compositions is the fact that the resin itself is light colored or water white and light stable, molded articles may be made which are white or ivory or of delicate shades of color. To meet requirements of this sort, however, calls for the use of a cellulose filler which in itself is white and for such purposes the highly refined cellulose known as alpha stock or bleached sulphite pulp and the like may be used advantageously. However, such stock usually has to be comminuted in a powerful shredding machine before use and this in itself tends to create a filler which is of a voluminous character and such condition, together with the swelling effect due to water, produces a composition having far too great a bulk to be molded directly.

One method which has been adopted to permit densification is to compress the ground material in a pilling type of apparatus and then crush the pilled material and use the granulated product. This secures a good degree of densification but does not allow of the escape of certain gases or gas-forming agents which are present in or are occluded by the composition as a result of the process of manufacture. Hence, when such material is molded, especially in deep or complicated molding cavities, gas may collect in remote parts of the mold causing blistering of the article or an unsightly appearance of the surface which completely destroys the fine appearance of the molded piece. (The term pilling refers to compression of the composition into cakes which are to be granulated and should not be confused with tabletting, a final step prior to molding to form a mass into a shape corresponding to the size and general outline of the finished molded article.)

I have observed, however, that if the composition is densified by warm milling rolls and the like, a substantially complete elimination of the gas-forming substances, such as water, methyl alcohol, and so forth, results, providing a composition which may be molded directly in molds without any such measure of gas evolution as will cause the molded article to be impaired in appearance or strength and yielding a product which will mold with the ease and trouble-free character of well-made phenolic compositions.

The present invention is particularly concerned with rolling or macerating attrition as a form of impregnation and densification which, as indicated above, may be carried out by passing the stock through milling rolls or other kindred types of rolls such as those of the Banbury mixer. The various sorts of rolls used for the purpose may be suitably heated and in some cases I may put through warm milling rolls a charge of wet material which is rolled and rerolled until moisture, excess formaldehyde, and so forth, have been eliminated. In other words, the wet composition before being introduced into the dryer is passed through steam-heated rolls, preferably arranged in the form of a train so that the product passes from roll to roll and is densified into thin flakes which, if desirable, may be oven dried to reduce moisture to the desired point. In this connection it may be stated that I prefer the total water content, both mechanical and chemical, of the composition in finished form not to exceed about 8 per cent, of which preferably less than one-half may be mechanical and the balance chemical. A determination of water content may be made by heating, for example, 25 grams of the composition in 250 cc. of xylol, using a condenser which returns the xylol but permits collection of the water. By reading the volume of water obtained in the first portion the mechanical water can be readily calculated, while the later portion coming over when the xylol has been heated to the curing temperature of the composition may be expressed as chemical water.

Another procedure is to eliminate most of the water by drying before subjecting the composition to rolling attrition. Thus the material hot from the driers is subjected to the action of differential rolls where the usual heavy pressure and attrition of such milling rolls is exerted. Since one roll in a differential train of this type revolves faster than another to which it is juxtaposed, a milling action under heavy pressure results and the material undergoing the milling treatment is roll-ground and well densified. Further densification occurs in the compression caused by sheeting rolls when these are used. Owing to the pressure and stresses exerted by the differential rolls they quickly become heated and therefore the temperature of the milling mass is raised above room temperature, which affords opportunity for the progress of condensation and degasification.

Rolling attrition can also be carried out in the following way. The material as it comes from the driers is ground to a fine powder in a ball mill and the necessary quantities of pigment, accelerator and mold lubricant are added. The powder thus obtained is placed in a mixer where it is subjected to the action of mixing rolls or revolving blades that squeeze the material against the walls of the mixer and where, at the same time, a hydraulic ram forces the charge into the mixer, causing a pressure to be exerted on the composition at the point of milling attrition of, say, 100 to 1000 pounds per square inch while the consolidating and homogenizing effect progresses. The temperature in the mixer is preferably kept below about 80° C. and the pressure-mixing is continued until the material is in the form of firm granules. Gaseous products generated by this treatment are allowed to escape, for example through an annular opening around the ram shaft. When properly consolidated and degasified the material is discharged and is ready for hot-pressing.

Numerous modifications are possible in the foregoing manner of procedure. For example, the urea cellulose product coming wet from the mixers may be dried and the crumbs of dried material may then be mixed with a dye or pigment, a mold lubricant, and so forth, and the mix subjected to rolling attrition. The crushing or macerating action under the heat and pressure of rolling attrition causes good intermingling of the color with the urea resin cellulose stock accompanied by a densification of the material. After such treatment the product may be readily comminuted as, for example, by projecting it in a strong air blast against a resistant surface. Thus comminuted the powder may be used directly for molding or may be granulated, preformed, or otherwise be suitably prepared for the final step of molding.

Under treatments such as the above the condensation reaction is partly advanced and the volatiles present or thereby engendered are sufficiently eliminated; this further condensation, of course, being kept below the point at which products of deficient flow result. By this procedure a composition from which undesirable gaseous compounds are removed and at the same time one of suitably densified nature is obtained.

The degasification and densification can be carried out in any kind of apparatus where pressure can be exerted and volatiles eliminated. In machines where heat-treatment under pressure occurs in a more or less confined space, it may be necessary to control the frictional heat by suitable means so as to prevent the temperature from reaching an unduly high point and precuring the resin. In cases where the pressure-mixing is done, for example, on exposed rolls the temperature may be kept at any desired point by continuous heating, for example, by steam or hot water circulation in the rolls.

Thus it is possible by the rolling attrition referred to above to obtain a consolidated mass compacted to a volume approximately one-half that of the ordinary powder and such material when crushed to form granules will exhibit a specific volume of 135 to 150, which represents a density adequate for most molding operations and which compares favorably with the density obtained more simply by the employment of the easily made, substantially anhydrous phenol-formaldehyde resins. At the same time the pressure to which the cellulose urea resin is exposed in this way tends to improve the translucency of the resulting molded article. From this standpoint a vacuum treatment followed by pressure represents an alternative procedure, as will be later discussed.

Preferably an aqueous urea resin syrup, diluted with water or undiluted, as the case may be, is mixed with the cellulose. Thorough impregnation is important in order to secure that change in the character of the cellulose which results in the production on hot pressing of translucent articles. Impregnation of cellulose fiber may be conducted by a vacuum and pressure process, that is, the fiber as such or in paper form or otherwise is placed in a closed receptacle and the air withdrawn to produce a high vacuum. The urea resin impregnating syrup then is run into the receptacle and pressure is applied. In this way the fibers are better impregnated. This is desirable in particular when paper of some thickness is used. Impregnation adequate to fill the canals of the fibers in a substantially complete manner tends to yield the highest degree of transparency or translucency in the finished molded article or laminated sheet. A vacuum of, for example, 20–25 inches or thereabouts of mercury may be employed, followed by a pressure of 50–100 pounds or higher, as desired.

Commercial formaldehyde solution is generally used because this represents the cheapest form in which the aldehyde is obtainable. The reaction with urea and the formalin may be carried out in the cold (at room temperature or lower) or it may be effected by heating to the boiling point or to various intermediate temperatures. The time required at the higher temperatures is correspondingly shorter but for some purposes reaction in the cold, that is, at room temperature or under artificially refrigerated conditions may be carried out. The color of the molded article generally is improved when the reaction occurs at a low temperature. At the lower temperatures a time of reaction which oftentimes will run to one or two days or more may be found necessary.

Commercial formaldehyde is usually about 37 to 40 per cent strength as furnished to the market in the United States and contains a small percentage of free acid which reckoned as formic is about 0.02 to 0.06 per cent. The reaction between urea and formaldehyde is influenced by the proportion of acid present and while I prefer to carry out the reaction under conditions which are rather on the acid than the alkaline side, nevertheless a reduction in the acidity of the crude formalin is desirable. This may be carried out by using neutral formalin of a pH of 7. Another method is to react the formalin with the cellulose filler, when the latter is to be used, as is generally the case, to adsorb the formic acid. Thus by mixing cellulose filler and formalin solution and allowing them to stand for a period of several hours a very substantial reduction in acidity as measured by pH occurs. For example, formalin having an acidity represented by pH 2 will drop to an acidity of pH, say 6 or 6.5. When adsorption of formic acid by the filler has proceeded sufficiently, urea may be introduced and reacted in the cold or by heating, if desired. Sometimes magnesium carbonate and the like may be added to prevent too highly acid conditions.

It is preferable to keep the batch from becoming alkaline as with an alkaline reaction the batch dries more slowly and tends to remain hygroscopic. Preferably at all times, at least until the molding stage is reached, the batch should not show a pH in excess of 7 towards the alkaline side. A pH of 7 to 6.6 is satisfactory.

If cellulose filler is not present during the preliminary step of exposing it to the action of formalin but instead the urea and formalin have been reacted either hot or cold, the filler is charged into the reaction solution and is agitated until good mixture results. If the urea resin solution at this stage is too thick and syrupy for good penetration into the cellulose fiber, dilution with a limited proportion of water may be employed to assist, in conjunction with vacuum and pressure impregnation, working on rolls and the like. Customarily also I prefer to add a few per cent of a white mineral pigment, such as titanium oxide or lithopone to act as a destarching agent, as described in pending applications; the addition of the destarching agent may, however, be postponed if desired until the later stage of grinding is in order.

In the production of urea resin molding compositions meeting a broad range of commercial requirements a careful control of all the factors entering into the manufacture of the material is necessary. Since the usual colors are either white, ivory, or of very light tints, any dust or dirt getting into the batch will cause an unfavorable appearance of the molded article. Hence freedom from dust in the various stages of manufacturing is necessary.

Rolling attrition generally tends to improve the rate or speed of cure, often raising the rate by 25 to 35 per cent. This is an improvement of importance in practical molding, where great output is essential.

Another result achieved in the employment of rolling attrition to prepare the molding composition in suitable densified form is that apparently a more heat-elastic product can be obtained. In some cases articles which have threads molded thereon, such as bottle caps, cannot be removed from the mold except by unscrewing the molded piece, a difficulty which is aggravated if high molding temperatures are desired to obtain rapid production. The densified material made by rolling attrition, especially if properly proportioned with respect to cellulose and resin, often evinces a condition of elasticity which is helpful in the removal of threaded articles, such as bottle caps, by springing the cap over the threads while the article is still hot. Such a stripping operation cannot be carried out if the threads are very deep but if shallow the article may be molded at a relatively high temperature and be stripped from the mold before burning sets in. Compositions of this character, therefore, permit of a much greater production of such molded goods than could be accomplished otherwise.

The feature which constitutes the preferred embodiment of the present invention is that of conduct of at least a part of the step of reacting urea and formaldehyde or the products derived therefrom under pressure greater than atmospheric during some stage of conversion up to the time that the molded composition is finished and ready to be tabletted and/or molded under pressure. In the present invention I seek to advance the reaction and impregnation of cellulose further during the processing, involving the use of pressures usually less than ordinary molding pressures but, nevertheless, sufficient to improve impregnation of the cellulose with the urea resin and to react it further to such extent as desired, probably with the occurrence of more or less combination of the resin with the cellulose to form a cellulosate.

As noted above, translucency is a highly important property and the operation of treating under an intermediate pressure or prepressure prior to molding tends to improve the translucency of the molded article.

Stated in its simplest terms, the preferred embodiment of the present invention involves a process for treating cellulose compositions with urea resin bodies under superatmospheric pressure prior to molding or tabletting (preforming) and molding; in other words, prior to the final stages of shaping to tablet and molded forms.

The following examples are given to illustrate the invention as set forth above, it being understood that they are not to be considered as limiting. Parts are by weight.

*Example 1.*—363 parts of 37% aqueous formaldehyde and 315 parts of alpha cellulose in flock form were mixed in a machine of the dough-mixing type for 15 minutes at room temperature. 180 parts of urea were added and the whole mixed for 1 hour further. The mix was then passed six times through milling rolls at 95° C. After this treatment it was in the form of thin whitish-gray flakes. The material was dried, ground to a powder, and incorporated with 1 cc. of glycerol dichlorohydrin and 0.5 g. of zinc stearate per 100 g. of powder by grinding further in a ball mill.

The resulting composition, which had a density of 0.77 g. per cc., was molded at 140° C. at a pressure of 3000 pounds per square inch for 2 minutes, a light-colored, highly glazed, mechanically strong molding in the form of a cup being obtained.

*Example 2.*—243 parts of 37% aqueous formaldehyde and 180 parts of alpha flock were churned in a mixer for 10 minutes. 90 parts of urea and 1.8 parts (0.5%) of zinc stearate were added and the whole mixed further for 1 hour. The mix was then hot-rolled four times, replaced in the mixing machine with 3.6 parts of glycerol dichlorohydrin and mixed for 2 hours further. It was hot-rolled again eight times and the flakes which were formed were air-dried and ground in a ball mill.

The resulting powder was molded at 140° C., 3000 pounds per square inch, for 1½ minutes. A light colored cup was produced which possessed a highly glazed surface.

*Example 3.*—180 parts of alpha flock (equivalent to 50% filler based on the resin) and 243 parts of 37% formaldehyde were mixed in a dough mixer for 15 minutes. 90 parts of urea and 1.8 parts of zinc stearate (0.5%) were added and the mass mixed for 2 hours, when 3.6 parts of dichlorohydrin were added and the whole mixed for 2 hours more. The batch was densified between rollers at 95° C. by rolling ten times. The flakes thus obtained were dried at 35° C. for 2 hours.

The composition was molded at 142° C., using a pressure of 3000 pounds per square inch for 1½ minutes. A homogeneous, light colored, highly glazed molding was obtained. The molding (which was a cup-shaped article) possessed considerable flexibility and springiness when ejected from the mold.

*Example 4.*—160 parts of alpha flock which had a pH of 5.5 and 241 parts of 37% formaldehyde (containing 0.06% acid calculated as formic) were churned together in a mixer for 10 minutes. The pH of the mix was 5.0. The wet mass was stored in an air-tight container for 48 hours when the pH was found to be 6.0. It was then mixed for 15 minutes with 120 parts of urea, and stored for 24 hours further in an air-tight container. The pH of the composition at this point was 6.7. 3.3 parts of dichlorohydrin and 2 parts of zinc stearate were mixed in for 20 minutes, the pH being 6.2. The whole was hot-rolled nine times, dried for 24 hours at room temperature, and ground in a ball mill.

The resulting powder was molded at 125° C., 3000 pounds per square inch for 3 minutes and also for 2 minutes. The moldings produced were satisfactory, the flow being soft, the color light, and the surface highly glazed. They were very strong mechanically and were also slightly flexible.

*Example 5.*—241 parts of 37% aqueous formaldehyde were adjusted to a pH of 7 with sodium hydroxide. This was incorporated with 168 parts of alpha flock (which had a pH of 6.5), producing a mixture having a pH of 6.5. 120 parts of urea were added and mixed in for 15 minutes; the pH was 6.7. The temperature throughout the above operations was 15° C. 2 parts of zinc stearate and 3.3 parts of glycerol dichlorohydrin were added and the whole was passed through heated rolls five times. The composition was dried at room temperature overnight and the pH was found to be 6.5.

The product was molded at 125° C., 3000 pounds per square inch, for 3 minutes, and again at 118° C. for 5½ minutes. The moldings were light colored, had a moderately glazed surface, and were homogeneous. They had no tendency to stick to the mold. The composition had a medium flow.

*Example 6.*—168 parts of alpha flock (pH=6.5) and 241 parts of 37% formaldehyde (pH less than 2) were mixed for 10 minutes in a mixing machine. After mixing the pH was 5.0. 120 parts of urea were added and mixed in for 15 minutes (pH=6 after mixing). 2 parts of zinc stearate and 3.3 glycerol dichlorohydrin were incorporated and the whole hot-rolled five times.

After drying a composition having a pH of 6.7 was obtained. This was molded at 125° C., 3000 pounds per square inch, for 3 minutes. Light-colored, highly glazed, mechanically strong moldings were obtained.

*Example 7.*—280 parts of 37% aqueous formaldehyde were adjusted to a pH of 7.0 with sodium hydroxide and boiled under reflux with 138 parts of urea for 35 minutes, more caustic being added to keep the pH at 7.0 after the boiling started.

160 parts of alpha flock were placed in an autoclave, warmed to 70° C., and a vacuum of 22½ inches of mercury was gradually applied and held for 5 minutes. The vacuum was released and the resin syrup prepared as described in the preceding paragraph was run in, the temperature being 82° C. A 20-inch vacuum was again applied with stirring of the flock and resin mixture. Air at 50 pounds per square inch gage pressure was then allowed to enter the autoclave to create a good impregnation pressure, this pressure being subsequently released, the mix removed, and dried for 16 hours at 50° C. The composition was ball milled for 1 hour, screened, and reground with 1 cc. of glycerol dichlorohydrin and 0.35 g. of zinc stearate per 100 g. of composition.

When molded at 140° C., 3000 pounds per square inch, for 5 minutes, a white, translucent article was produced. The flow of the material was very good.

*Example 8.*—Example 7 was repeated, except that the 50 pounds of air pressure was not applied, but instead the autoclave was simply opened to create atmospheric pressure, the mix removed and dried; the further treatment being as in Example 7.

The composition was molded at 140° C., 3000 pounds per square inch, for 5 minutes. A light-colored, homogeneous, moderately translucent cup was obtained. The translucency was not as perfect as that of a molding obtained under Example 7. The flow of the composition, however, was excellent.

*Example 9.*—The procedure of Example 7 was repeated, except that neither vacuum nor pressure was applied, the syrup merely being mixed with the filler at atmospheric pressure.

Upon molding this composition at 140° C., 3000 pounds per square inch, for 5 minutes, a light blue-gray, homogeneous article was obtained, showing good flow. The translucency, while fair, appeared to be less than that of articles obtained by both Examples 7 and 8.

*Example 10.*—160 parts of alpha flock, 280 parts of 37% commercial aqueous formaldehyde, and 0.3 part of magnesium carbonate were thoroughly mixed together for 20 minutes. A mix which had a pH of 5.5 was obtained, and to this was added 138 parts of urea, 2 parts of zinc stearate, and 4 parts of glycerol dichlorohydrin. The whole was then subjected to rolling attrition by passing ten times through rolls at a temperature of 95° C., dried at room temperature overnight and further at 45° C. in a current of air for 2 hours.

The composition was molded at 145° C., 3000 pounds per square inch, for 5 minutes and also for 7 minutes. Strong, light-colored, well-formed cups were obtained which were unaffected when boiled in water for 10 minutes.

*Example 11.*—280 parts of 37% formaldehyde (pH 7.0) and 138 parts urea were heated under a reflux condenser and started to boil after 12 minutes. After boiling for a period of 30 minutes the pH was 6.0. 2.2 parts glycerol dichlorohydrin were then added and the syrup was then poured over 160 parts of alpha flock (pH 6.5) forming a mass having a pH of 6.5. This was air-dried at room temperature for 24 hours and further dried for 8 hours in a current of air at 70° C. The mix then had a pH of 6.6.

The dried material was ground in a ball mill for 2 hours, 1.5 parts of pulverized carnauba wax added and the whole ball-milled for 8 hours. The powder was fed between hot rolls (95° C.) three times and after this treatment by rolling attrition the flakes formed were reground in a ball mill and screened.

The resulting composition was molded at 140° C. for 6 minutes at 3000 pounds per square inch. Light-colored, uniform, glazed, well-formed moldings were obtained.

What I claim is:

1. In the art of making cellulose and urea aldehyde resin molding compositions, the steps which comprise effecting impregnation of the cellulose with an aqueous urea-aldehyde resin initial condensate and subsequently subjecting the impregnated material to the action of rolling attrition pressure at a temperature precluding precuring of the resin prior to shaping to approximately final form for molding.

2. In the art of making cellulose and urea-formaldehyde resin molding compositions, the steps which comprise effecting impregnation of the cellulose with an aqueous urea-formaldehyde resin initial condensate, subsequently subjecting the impregnated material to the action of rolling attrition pressure at a temperature precluding precuring of the resin prior to molding and pulverizing the pressure-treated material.

CARLETON ELLIS.